J. MAROLD.
HORN OPERATING DEVICE.
APPLICATION FILED JAN. 19, 1915.
1,177,122.
Patented Mar. 28, 1916.
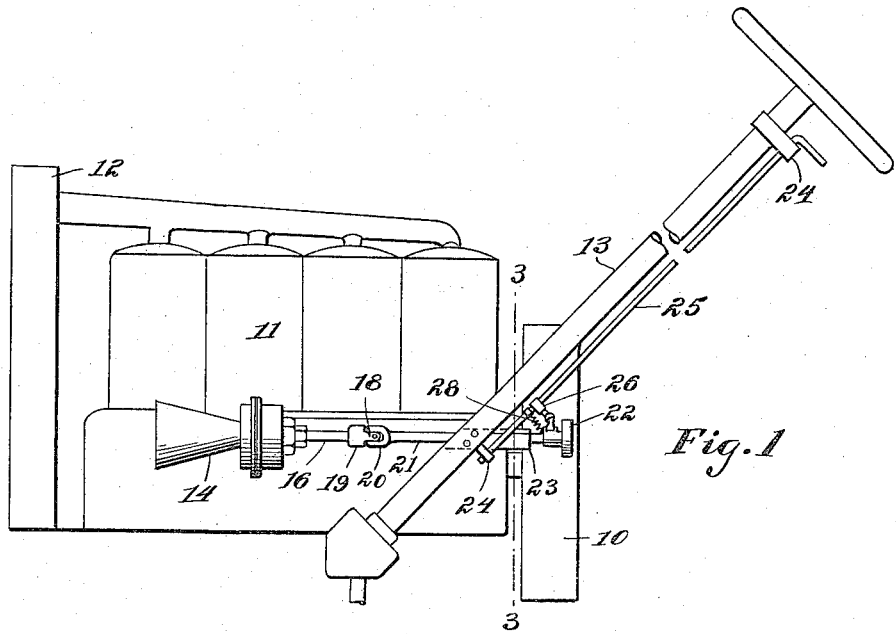
Fig. 1
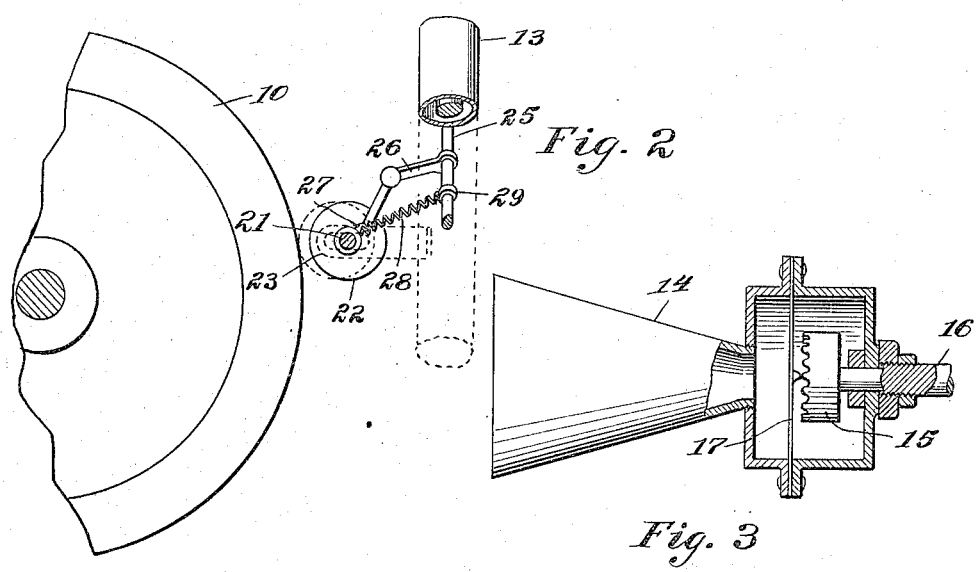
Fig. 2
Fig. 3
Inventor
John Marold,
By Victor J. Evans
Attorney
Witnesses

UNITED STATES PATENT OFFICE.

JOHN MAROLD, OF MADISON, ILLINOIS.

HORN-OPERATING DEVICE.

1,177,122.

Specification of Letters Patent.

Patented Mar. 28, 1916.

Application filed January 19, 1915. Serial No. 3,168.

*To all whom it may concern:*

Be it known that I, JOHN MAROLD, a citizen of the United States, residing at Madison, in the county of Madison and State of Illinois, have invented new and useful Improvements in Horn-Operating Devices, of which the following is a specification.

An object of the invention is to provide a simple device particularly adapted for use on automobiles and which sounds the usual horn.

The invention contemplates, among other features, the provision of a device for readily sounding an automobile horn of the type which comprehends a revoluble member operating in conjunction with a sounding disk or diaphragm whereby the desired sound is obtained, the device for operating the horn being of a purely mechanical construction, thus obviating the use of electricity to accomplish the result.

In the further disclosure of the invention reference is to be had to the accompanying drawings, constituting a part of this specification, in which similar characters of reference denote corresponding parts in all the views, and in which:

Figure 1 is a side elevation of the device, showing the manner of applying the same to the fly wheel; Fig. 2 is a vertical sectional view on the line 3—3 of Fig. 1, showing by full lines the normal position of the device and by dotted lines the active position thereof; Fig. 3 is a fragmentary vertical longitudinal sectional view taken through the structure shown in Fig. 1.

Referring more particularly to the views, I disclose a rotating member such as a fly wheel 10 of an engine 11 of an automobile 12, said automobile having the usual steering post 13. The horn, indicated by the numeral 14, is preferably of the type in which a member 15 carried upon a shaft 16 journaled on the body of the horn operates over a sounding disk or diaphragm 17 forming a part of the horn, thus producing the desired sound. A universal joint 18 is provided and contemplates a coupling member 19 on the shaft 16 and a coupling member 20 on a supplementary shaft 21, said supplementary shaft having a friction roller 22 keyed to its inner end, with a bearing 23 encircling the supplementary shaft 21. Now it will be clearly apparent that when the friction roller 22 engages the periphery of the rotating element or fly wheel 10 rotation will be imparted to the supplementary shaft 21 and through the medium of the universal coupling 18 will be imparted to the shaft 16, thus causing the member 15 to operate upon the diaphragm 17 and sound the horn.

A plurality of brackets 24 are carried upon the steering post 13 and provide guides for supporting an operating rod 25 having the upper end of a link 26 connected thereto, with the lower end of said link connecting with an apertured lug 27 on the bearing 23, a suitable contractile spring 28 connecting with a collar 29 encircling the operating rod 25, with the lower end of said spring suitably connected to the bearing 23.

Now in the operation of the device, when it is desired to sound the horn a slight turning movement is imparted to the operating rod 25, thus straightening out the link connection 26 between the operating rod and the supplementary shaft and forcing the friction roller 22 laterally into engagement with the periphery of the rotating element 10 and causing the supplementary shaft 21 to be rotated, and thus through the medium of the coupling 18 imparting rotation to the shaft 16 and sounding the horn. At the moment the turning pressure on the operating rod 25 is released the spring 28 will exert a lateral pull upon the friction roller and supplementary shaft, thus moving the friction roller out of engagement with the periphery of the rotating element or fly wheel, thereby resulting in a discontinuance of the sounding of the horn.

From the foregoing description it will be seen that the structure described is of a simple construction, consists of few parts, can be cheaply manufactured and can be readily applied to various makes of automobiles and the like. It will of course be understood that the friction roller can be so arranged as to engage one of the rotating elements of the engine, whether it be the fly wheel or some other rotating element thereof.

Having thus described my invention, I claim:

In combination with a rotating element, a horn comprising a revoluble shaft, of a supplementary shaft, a coupling connecting the supplementary shaft with the said revoluble shaft, a friction roller on the supplementary shaft, a turnable operating rod, a link connection between the operating rod and said supplementary shaft whereby a turning movement of the operating rod will move the friction roller into engagement with the rotating element, and a spring supported on the operating rod and connected
5 with the supplementary shaft for normally holding the friction roller out of engagement with the rotating element.

In testimony whereof I affix my signature in presence of two witnesses.

JOHN MAROLD.

Witnesses:
 FRED CLAY,
 MORGAN LOVELL.

Copies of this patent may be obtained for five cents each, by addressing the "Commissioner of Patents, Washington, D. C."